US008726334B2

(12) United States Patent
Neystadt et al.

(10) Patent No.: US 8,726,334 B2
(45) Date of Patent: *May 13, 2014

(54) MODEL BASED SYSTEMS MANAGEMENT IN VIRTUALIZED AND NON-VIRTUALIZED ENVIRONMENTS

(75) Inventors: John Neystadt, Kfar-Saba (IL); Yigal Edery, Pardesia (IL); Yan Belinky, Yokneam Illit (IL); Anders B Vinberg, Kirkland, WA (US); Dennis Scott Batchelder, Bellevue, WA (US); Shimon Yannay, Haifa (IL)

(73) Assignee: Microsoft Corporation, Redmond, WA (US)

( * ) Notice: Subject to any disclaimer, the term of this patent is extended or adjusted under 35 U.S.C. 154(b) by 721 days.

This patent is subject to a terminal disclaimer.

(21) Appl. No.: 12/633,805

(22) Filed: Dec. 9, 2009

(65) Prior Publication Data

US 2011/0138441 A1 Jun. 9, 2011

(51) Int. Cl.
*H04L 9/00* (2006.01)
*H04L 29/06* (2006.01)
*G06F 21/53* (2013.01)

(52) U.S. Cl.
CPC .............. *H04L 63/20* (2013.01); *H04L 63/10* (2013.01); *G06F 21/53* (2013.01)
USPC .............. 726/1; 426/2; 426/3; 426/4; 426/5; 426/6; 713/155; 713/56; 713/157

(58) Field of Classification Search
CPC .......... H04L 63/20; H04L 63/10; G06F 21/53
USPC ............................................................ 726/1
See application file for complete search history.

(56) References Cited

U.S. PATENT DOCUMENTS

| | | | |
|---|---|---|---|
| 6,279,111 B1 | 8/2001 | Jensenworth et al. | |
| 7,200,530 B2 | 4/2007 | Brown et al. | |
| 2005/0120160 A1 | 6/2005 | Plouffe et al. | |
| 2006/0224741 A1* | 10/2006 | Jackson | 709/226 |
| 2007/0106986 A1 | 5/2007 | Worley, Jr. | |
| 2007/0112574 A1 | 5/2007 | Greene | |
| 2007/0266433 A1 | 11/2007 | Moore | |
| 2008/0148341 A1 | 6/2008 | Ferguson et al. | |

(Continued)

OTHER PUBLICATIONS

Haletky Edward L. , "VMware vSphere and Virtual Infrastructure Security: Securing the Virtual Environment", Retrieved at<<http://www.informit.com/store/product.aspx?isbn=0137158009>>, Jun. 22, 2009.

(Continued)

*Primary Examiner* — Longbit Chai
(74) *Attorney, Agent, or Firm* — Jim Ross; Leonard Smith; Micky Minhas (57) ABSTRACT

Architecture that provides model-based systems management in virtualized and non-virtualized environments. A security component provides security models which define security requirements for services. A management component applies one or more of the security models during the lifecycle of virtual machines and services. The lifecycle can include initial deployment, expansion, moving servers, monitoring, and reporting. The architecture creates a formal description model of how a virtual machine or a service (composition of multiple virtual machines) is secured. The security requirements information can also be fed back to the general management system which uses this information in its own activities such as to guide the placement of workloads on servers can be security related.

22 Claims, 7 Drawing Sheets

(56) References Cited

U.S. PATENT DOCUMENTS

| | | | |
|---|---|---|---|
| 2008/0320583 | A1 | 12/2008 | Sharma et al. |
| 2009/0113517 | A1 | 4/2009 | Engdahl et al. |
| 2009/0235324 | A1 | 9/2009 | Griffin et al. |
| 2009/0241192 | A1 | 9/2009 | Thomas |
| 2009/0249470 | A1* | 10/2009 | Litvin et al. .................... 726/13 |

OTHER PUBLICATIONS

Begoli Edmon, "Prototype Complex Enterprise Solutions with Just Your Workstation", Retrieved at<<http://www.devx.com/vmspecialreport/Article/30382/1954>>, Jan. 30, 2006.

Garfinkel, et al. "When Virtual is Harder than Real: Security Challenges in Virtual Machine Based Computing Environments", Retrieved at<<http://www.stanford.edu/~talg/papers/HOTOS05/virtual-harder-hotos05.pdf>>, Published 2005.

Cowper Bruce, "Virtualization Security", Retrieved at<<http://www.infosecuritycanada.com/images/100358/2008_PDFs/Cowper_Virtualization_Security.pdf>>, 2008.

"Security within a Virtualized Environment: A New Layer in Layered Security", Retrieved at <<http://www.vmware.com/files/pdf/partners/security/security-virtualized-whitepaper.pdf>> Oct. 6, 2009.

"Securing the Cloud: A Review of Cloud Computing, Security Implications and Best Practices" Retrieved at <<http://www.savvis.net/en-US/Info_Center/Documents/Savvis_VMW_whitepaper_0809.pdf>> Oct. 6, 2009.

Quynh, et al., "Centralized Security Policy Support for Virtual Machine", Retrieved at <<http://citeseerx.ist.psu.edu/viewdoc/download?doi=10.1.1.106.7370&rep=rep1&type=pdf>>, Proceedings of the 20th conference on Large Installation System Administration, Dec. 3-8, 2006.

Drake, Hannah, "Virtual Machine Security Enters the Mainstream", Retrieved at <<http://searchservervirtualization.techtarget.com/news/article/0,289142,sid94_gci1350743,00.html>>, Mar. 16, 2009.

"Planning for Hyper-V Security", Retrieved at <<http://technet.microsoft.com/en-us/library/cc974516.aspx>>, Sep. 2008.

"Final Office Action", Mailed Date: Nov. 28, 2012, U.S. Appl. No. 12/727,267, filed Mar. 19, 2010, pp. 9.

"Non Final Office Action", Mailed Date: Jul. 10, 2012, U.S. Appl. No. 12/727,267, filed Mar. 19, 2010, pp. 9.

* cited by examiner

MODEL BASED SYSTEMS MANAGEMENT IN VIRTUALIZED AND NON-VIRTUALIZED ENVIRONMENTS

BACKGROUND

The deployment of virtual machines and the securing thereof are two separate and unrelated tasks that negatively impact resources and are prone to mistakes or inconsistencies due to the manual nature of coordinating between management and security. Some existing deployments implement a protection policy based on a manifest supplied by the applications. Other deployments monitor servers based on a model that specifies relations and resource requirements. These potential disconnects between security and administration can create errors that further cause security risks.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides model-based systems management in virtualized environments as well as non-virtualized environments. A security component is provided that includes security models which define security requirements for services. The services are defined using one or more virtual machines. That is, a service can be provided using a single virtual machine or a group of related virtual machines providing single logical service to the customer. A management component applies one or more of the security models to a service over a lifecycle of the service. Part of the management is the creation and deployment of a service, as well as adding one or more new virtual machines to a service or removing one or more existing virtual machines from the service. These changes can be made in response to dynamic changes in scale and capacity. The management system submits calls to security during both the service and virtual machine lifecycle.

The architecture creates a formal description model of how a virtual machine and/or a service (composition of multiple virtual machines) are secured. The virtual machine systems management architecture calls the security subsystem to apply the security requirements during the lifecycle of the virtual machine(s) (and services). The lifecycle can include initial deployment, expansion, moving servers, monitoring, and reporting, for example.

The description model can cover the following parameters for securing the system: virtual machine to physical machine mapping, host hardening/lockdown configuration, and firewall/IDS (intrusion detection system)/IPS (intrusion prevention system) configuration. The mapping (referred to as a virtualization management) is according to manual or automatic classification of workloads. For example, an SQL (structured query language) server and web server are classified differently, and thus, not placed on the same physical host. The host hardening/lockdown configuration parameters can apply to each virtual machine. The firewall/IDS/IPS configuration is employed to secure a newly deployed virtual machine.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture includes a systems management system that calls a security subsystem to apply security requirements during the lifecycle of virtual machines and/or services as well as non-virtualized environments, from initial deployment, expansion, moving servers, to monitoring, and reporting, for example. Alternatively, or in combination therewith, the security requirements information can be fed back to the general management system which uses this information in its own activities. For example, the classification which is used to guide the placement of workloads on servers can be security related, but the placement is a general management function. A placement algorithm that performs this placement function can employ many factors to determine placement—both the security classification described herein as well as resource requirements and available capacity, network bandwidth and latency requirements, network topology for access to a storage area network (SAN), reliability, and the designs of the administrator, for example.

The following example properties can be part of a security model: list of virtual machines, virtual machine mapping to physical machine, the assignment of classification labels to virtual machines, virtual machine provisioning logic that uses classification to isolate virtual machines on different virtual or physical networks, and a module that enables administrators to specify a policy that defines a desired level of isolation to assign to every group of virtual machines, based on classification.

Figure 1:
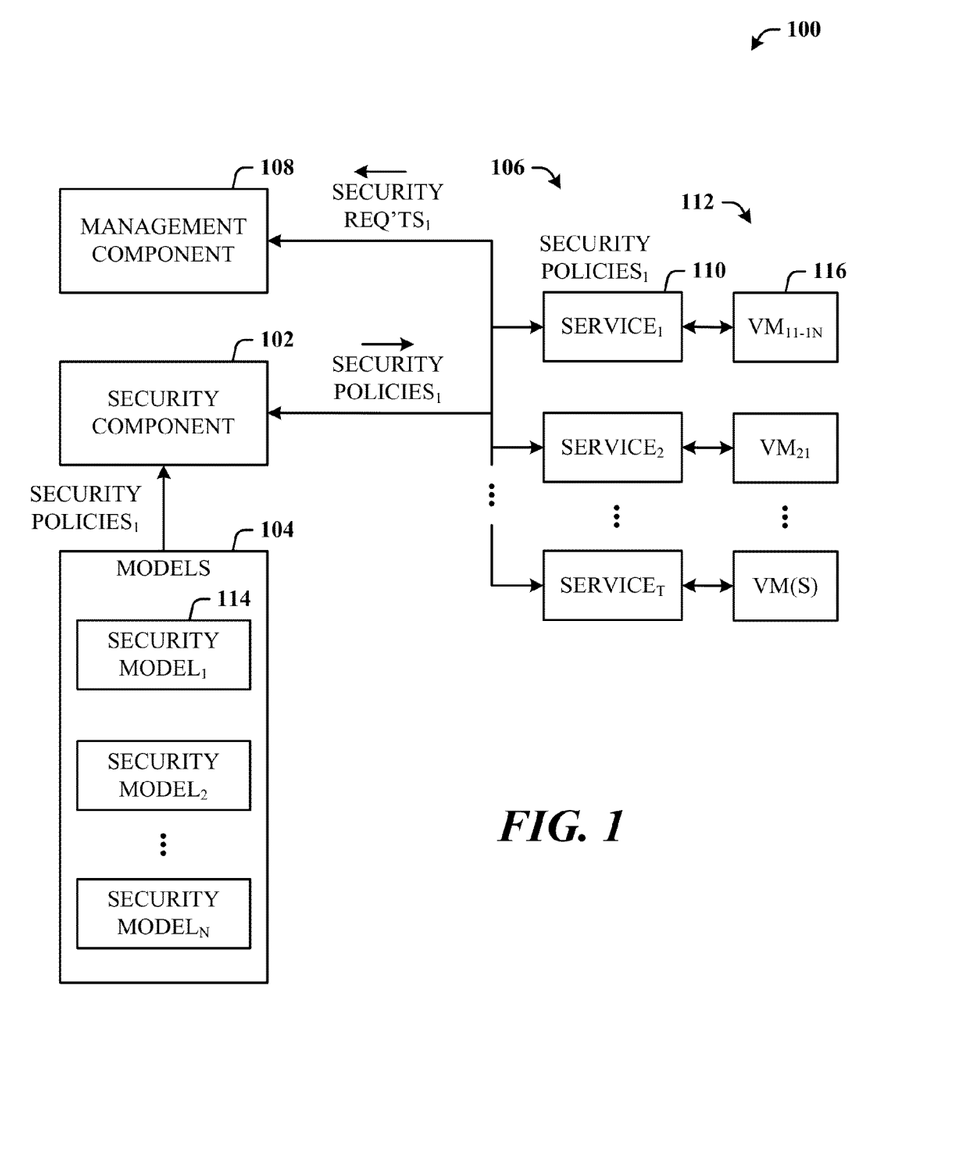
FIG. 1 illustrates a computer-implemented systems management system in accordance with the disclosed architecture.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifica- FIG. 1 illustrates a computer-implemented systems management system 100 in accordance with the disclosed architecture. The system 100 comprises a security component 102 associated with security models 104 which define security requirements for one or more computers that comprise logical services 106, and a management component 108 that applies one or more of the security models 104 to the services 106 (e.g., a first service 110) over a lifecycle of the services (e.g., the first service 110).

Each of the services 106 can be associated with one or more virtual machines (VMs) 112 to which the security models 104 (and policies thereof) are applied to provide a secure virtualized environment. The services 106 can be mapped to physical machines (not shown) according to the classification of workloads. The management component 108 associates functional models to the security models 104 to assign the one or more of the security models 104 to an appropriate function of the services 106.

Consider that a first security model 114 is created with policies that define the security requirements to be applied to the first security service 110. The security component 102 accesses the security policies (Security Policies$_1$) from the first security model 114 and applies the policies to the first service 110 and associated VM(s) 116 over the lifetime of the service 110 and VM(s) 116. Alternatively, the management component 108 can submit calls to the security component 102 to apply the policies directly or obtain (or receives) the security policies from the security component 102 and apply the policies to the first service 110 and associated VM(s) 116. In any case, the services 106 and virtual machines 112 may experience security policy changes or the same security polices over the lifetime of such services 106 and virtual machines 112.

As previously indicated, in one embodiment the management component 108 can apply the one or more security models 104 to facilitate deployment of the service 110, configuration update of the service 110, start/stop of the service 110, add new virtual machine(s) to the service 110 or remove virtual machine(s) from the service 110, and relocation of the service 110 across physical hosts or networks, for example, according to a dynamically changing requirements related to scale and/or capacity. The one or more of the security models 104 include mapping of the service 110 to physical machines, host configuration lockdown for the service 110, and configuration of firewall, intrusion detection, and intrusion prevention to secure the service 110. The security requirements (Security Req'ts$_1$) related to the first service 110 and associated VM(s) 116 can also be fed back to the management component 108 for its own purposes.

Figure 2:
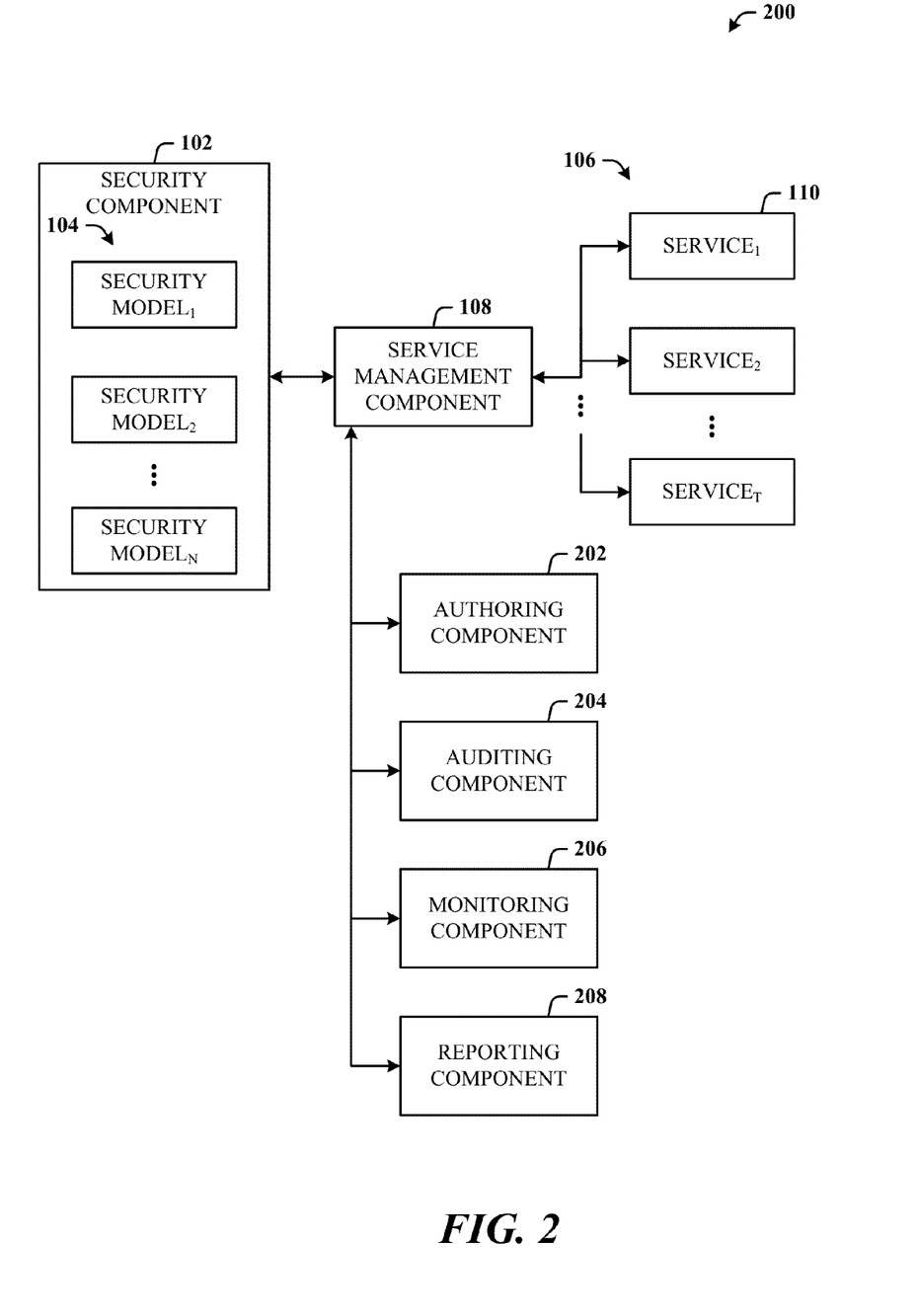
FIG. 2 illustrates an alternative embodiment of a systems management system.

FIG. 2 illustrates an alternative embodiment of a systems management system 200. The system 200 includes the entities and components of the system 100 of FIG. 1. The system 200 can further comprise an authoring component 202 for authoring the security models. The system 200 can further comprise an auditing component 204 that validates and detects discrepancies between a deployed service and the applied one or more security models. The system 200 can further comprise a monitoring component 206 for monitoring data handling and storage in compliance with imposed security practices and a reporting component 208 for generating reports related to maintaining compliance with security practices.

Put another way, a computer-implemented systems management system is provided that comprises a security component that includes security models which define security requirements for services and a management component that applies one or more of the security models to a service over a lifecycle of the service. The security models associated with functional models to assign the one or more of the models to an appropriate function of the service. The services include virtual machines to which the security models are applied, the virtual machines mapped to physical machines according to classification of workloads.

The system can further comprise at least one of an authoring component for authoring the security models, an auditing component that validates and detects discrepancies between a deployed system and the security model, or a reporting component for producing reports of compliance to the one or more of the security models applied.

The one or more of the security models include mapping of the servers the service is comprised of physical machines, networks to which virtual machines are connected, host configuration lockdown for the service and configuration of firewall, intrusion detection, and intrusion prevention subsystems to secure the service. The management component provides secure deployment of newly-added services according to a security model, and configuration of a network environment according to the security model.

Figure 3:
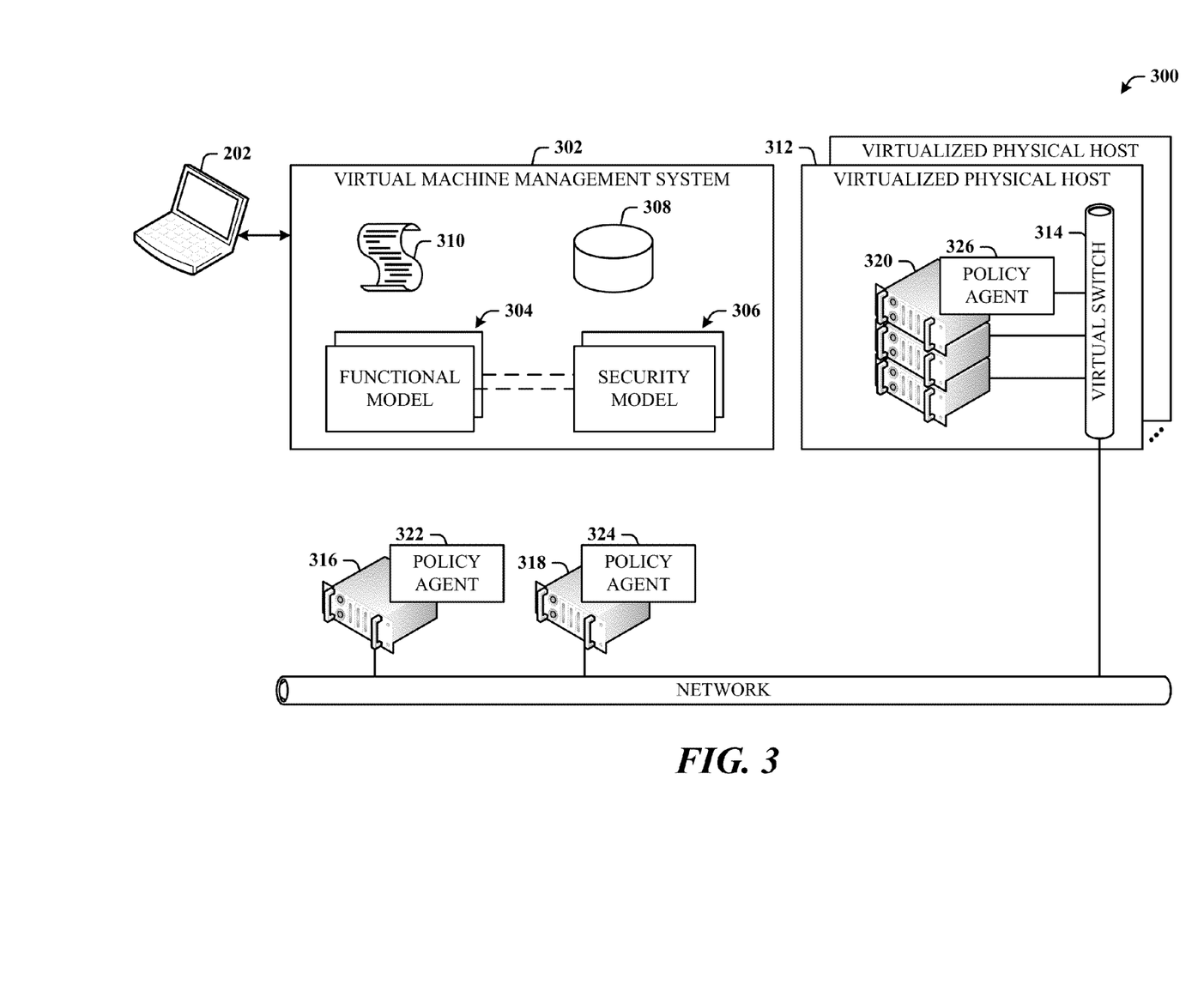
FIG. 3 illustrates a more detailed alternative embodiment of a systems management system for virtualized environments.

FIG. 3 illustrates a more detailed alternative embodiment of a systems management system 300 for virtualized environments. Modern management systems, such as a virtual machine management system 302 (management component 108), evolve towards model based management, when having formal functional models 304 that contain logical descriptions of one or more machines that comprise a service. The system 300 further introduces an extension to the management functional models 304 in the form of security models 306. The security models 306 are distinct from the functional models 304, but are associated with one another.

The contents of a security model can describe various formal aspects, such as machine classification 308, network security configuration and, host lockdown and hardening. With respect to machine classification, a classification label can be assigned to each virtual machine via a host classification system 308. Classification is used to guide the placement of workloads on servers (load management), which can be security related, but the placement is a general management function.

A placement algorithm that performs this placement function can employ many factors to determine placement such as both the security classification described herein as well as resource requirements and available capacity, network bandwidth and latency requirements, network topology for access to a storage area network, reliability, and the designs of the administrator, for example. Classification can be performed manually through an administrative action based on the software role installed in the virtual machine, or via an automatic classification system.

The virtual machine management system 302 can include logic that decides which physical host on which to place a virtual machine. This logic considers parameters such as CPU and I/O (input/output) load (resource). This logic also considers the virtual machine classification so that machines of different classifications are physically isolated by different virtual or physical networks, and optionally, different physical hosts. A virtual system administrator can specify a policy 310 that defines the level of isolation the administrator wants to assign to every group of virtual machines, based on classification.

With respect to network security configuration, the security models can include settings, such as (these are examples, there may be others) utilized to secure the following:

Network isolation and connectivity needs that can impact a virtualized physical host 312, and a virtual switch 314 in the host 312 to which a virtual machine is to be connected;

Where firewalls are to be deployed to isolate and secure different zones of a datacenter and to which networks the firewalls are connected. This can be done according to the host classification system 308 or role as specified in the functional service models 304;

Network firewall(s) 316—configuration elements such as which TCP/IP ports are to be allowed/denied to secure communications between the virtual machines, and application (e.g., layer-7) specific settings;

IDS/IPS configuration—IDS/IPS configuration properties specific to application roles implemented by each virtual machine;

Validation of the integrity of a file (e.g., virtual hard disk (VHD)) before launch of a virtual machine; and Encryption of the VHD file while at rest in the library or during transmission.

These functions can be included by policies attached to the security model(s). Many other functions can be provided, as desired.

With respect to host lockdown and hardening, a set of security practices exist for each application role. A security model 306 includes settings for host-specific security settings that can be automatically applied when a virtual machine is deployed, according to its role, as described in a functional service model 304.

With respect to using security models 306 in the systems management lifecycle, a number of tasks are typically performed that will use the security model to secure the system include initial deployment, expansion, moving servers, monitoring, and reporting.

With respect to initial deployment, consider that an administrator who operates the virtual machine management system 302, decided to deploy a new set of virtual machines 320. During deployment, the management system 302 invokes security policy agents (322, 324, and 326) to adjust the security of the deployed virtual machines 320 according to the security model(s) 306. The management system 302 can determine to provision additional virtual machines, such as firewall 316 or network IPS/IDS to satisfy the security model 306. The adjustment can be customized by the system-specific security policy 310.

With respect to expansion, consider that the administrator, or system, determines that there is insufficient capacity. As a result, a new virtual machine 320 can be provisioned. The disclosed architecture secures the newly added virtual machine 320 according to the security model(s) 306, and can reconfigure the network environment (network firewall(s) 316 and network IDS/IPS 318) according to the security model(s) 306.

Virtual machines can be moved to a different host (e.g., for load balancing or fault tolerance). When a virtual machine 320 is moved from one physical host (e.g., virtualized physical host 312) to another physical host, the security model(s) 306 can be used to choose a physical host and which virtual network to connect to the physical host via the virtual switch 314. If an IP address of the virtual machine 320 changes, the network environment (network firewall(s) 316 and network IDS/IPS 318) are adjusted accordingly.

With respect to monitoring and auditing configuration, the administrator can perform an audit of the actual system to detect deviations from the model/security policy according to constraints specified in the security model(s) 306, and either correct automatically or manually the configuration to be conformant, or approve an exception. For example, if a virtual machine is connected to a wrong virtual switch, or has Internet connectivity bypassing a firewall, this is detected, according to the security model(s) 306.

All the configuration operations and exception approvals can be audited. The administrator can produce reports of compliance of the system to the model, including a list of violations and approved exceptions from the model.

Additionally, the authoring component 202 enables the creation of the security model(s) 306. A model may be authored by developers of the service or by IT administrator, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
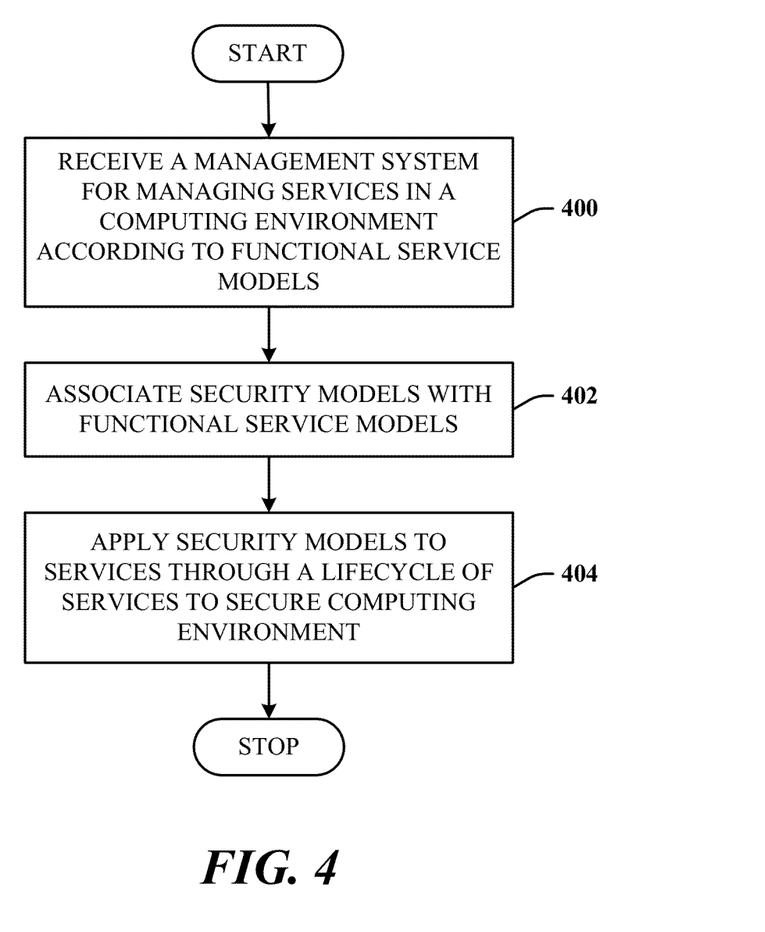
FIG. 4 illustrates a computer-implemented systems management method in accordance with the disclosed architecture.

FIG. 4 illustrates a computer-implemented systems management method in accordance with the disclosed architecture. At 400, a management system is received for managing services in a computing environment (virtual or non-virtual) according to functional service models. At 402, security models are associated with the functional service models. At 404, one or more security models are applied to the services through a lifecycle of the services to secure the computing environment.

Figure 5:
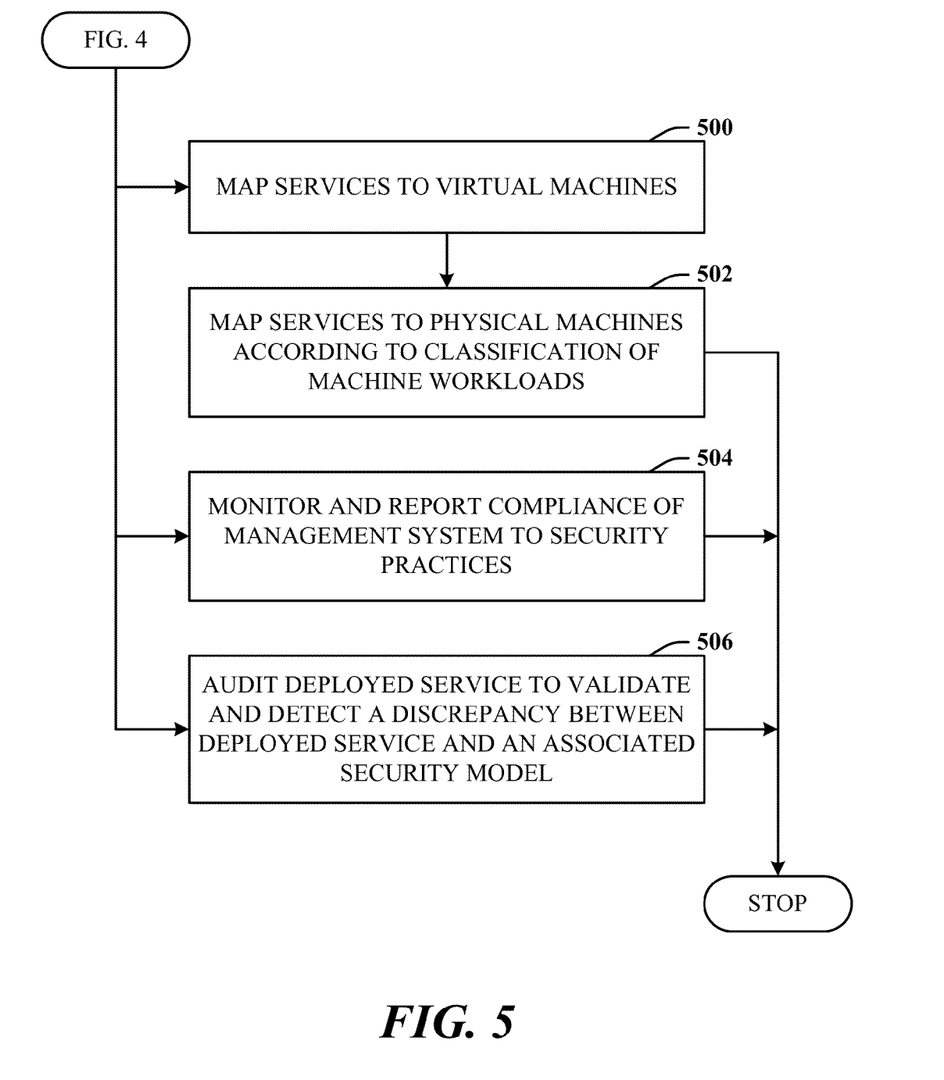
FIG. 5 illustrates additional aspects of the method of FIG. 4.

FIG. 5 illustrates additional aspects of the method of FIG. 4. At 500, services are mapped to virtual machines. In other words, a service can be mapped to a single virtual machine or to multiple virtual machines. At 502, the virtual machines are mapped to physical machines according to classification of machine workloads. At 504, compliance of the management system to security practices is monitored and reported. At 506, a deployed service is audited to validate and detect a discrepancy between the deployed service and an associated security model.

Figure 6:
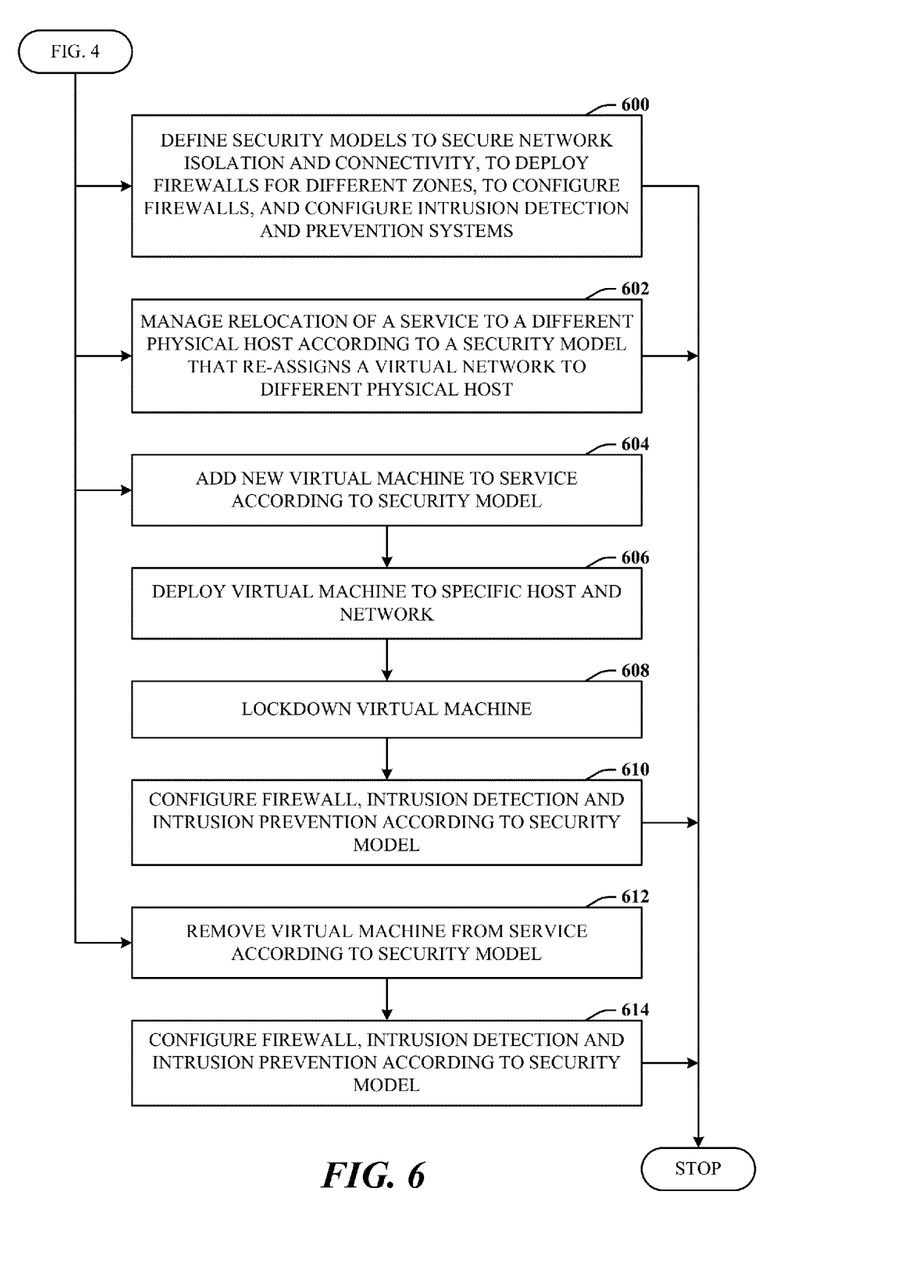
FIG. 6 illustrates additional aspects of the method of FIG. 4.

FIG. 6 illustrates additional aspects of the method of FIG. 4. At 600, the security models are defined to secure network isolation and connectivity, to deploy firewalls for different zones, to configure the firewalls, and configure intrusion detection and prevention systems. At 602, relocation of a service to a different physical host is managed according to a security model that re-assigns a virtual network to the different physical host. At 604, a new virtual machine is added to a service according to a security model. At 606, the virtual machine is deployed to a specific host and network. At 608, the virtual machine is locked down. At 610, firewall, intrusion detection, and intrusion prevention are configured according to the security model. At 612, a virtual machine is removed from a service according to a security model. At 614, firewall, intrusion detection, and intrusion prevention are configured according to the security model.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical, solid state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
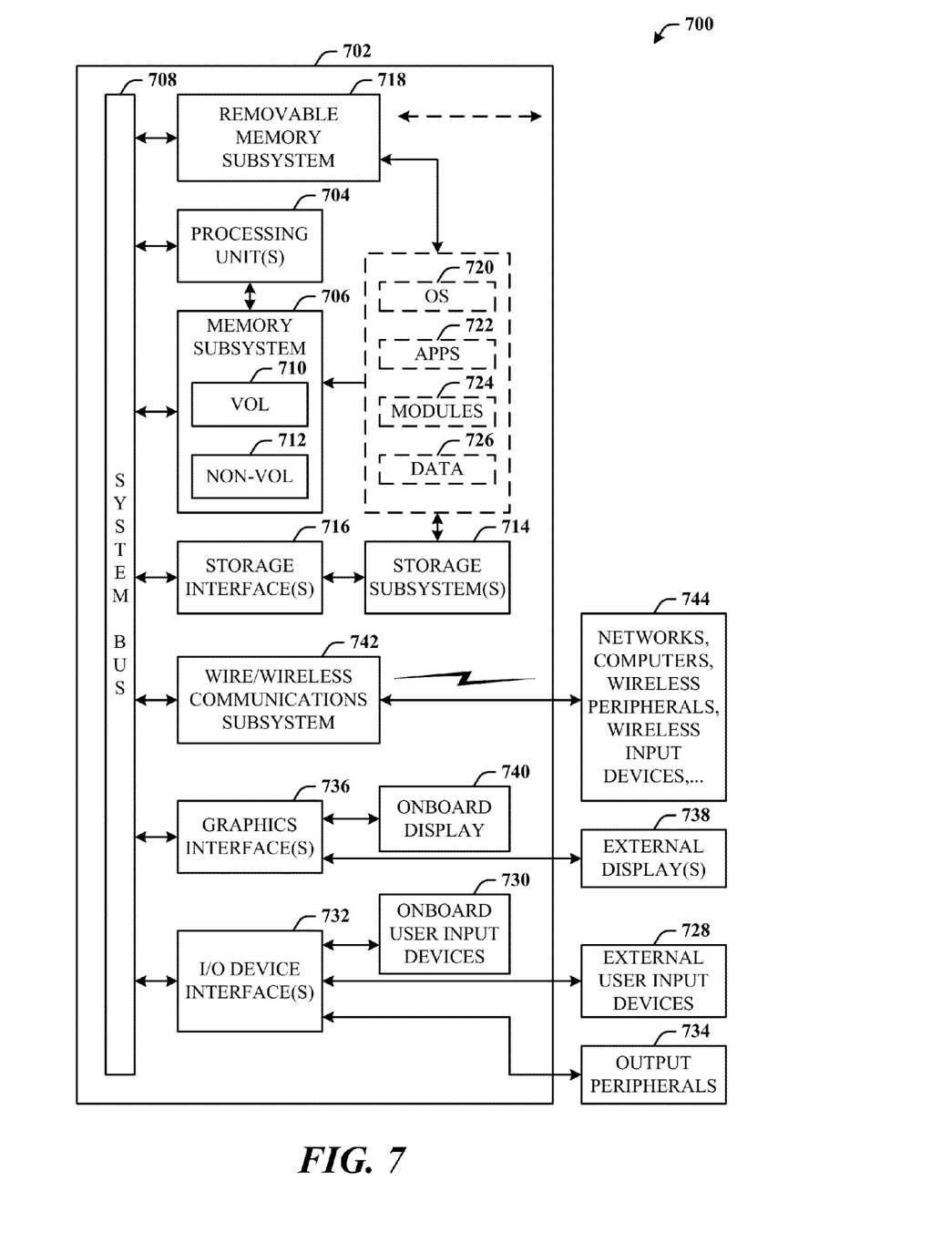
FIG. 7 illustrates a block diagram of a computing system operable to provide systems management in accordance with the disclosed architecture.

Referring now to FIG. 7, there is illustrated a block diagram of a computing system 700 operable to provide systems management in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the entities and components of the system 300 of FIG. 3, and the methods represented by the flow charts of FIG. 4-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

The illustrated aspects can also be practiced in distributed computing environments where certain tasks are performed by remote processing devices that are linked through a communications network. In a distributed computing environment, program modules can be located in local and/or remote storage and/or memory system.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented systems management system, comprising:
   a security component configured to access security policies included in security models, wherein the security models define security requirements for one or more computers that comprise logical services and provide, at least, mappings for the logical services according to a classification of workloads to provide a secured virtualized environment;
   a management component configured to associate functional models to the security models to assign the one or more security models to an appropriate function of a service of the logical services and to submit calls to the security component to obtain the security policies, and apply the security policies from one or more of the security models to the service over a lifecycle of the service; and
   a microprocessor configured to execute computer-executable instructions associated with at least one of the security component or the management component.

2. The system of claim 1, wherein the services are associated with one or more virtual machines to which policies of the security models are applied to provide a secure virtualized environment.

3. The system of claim 1, wherein the services are mapped to physical machines according to classification of workloads.

4. The system of claim 1, wherein the management component associates functional models to the security models to assign the one or more of the security models to an appropriate function of the service.

5. The system of claim 1, further comprising at least one of:
   an authoring component configured to author the security models;
   an auditing component configured to validate and detect discrepancies between a deployed service and the applied one or more security models; or
   monitoring and reporting components configured to maintain compliance with security practices.

6. The system of claim 1, wherein a security model includes firewall settings that secure communications between virtual machines.

7. The system of claim 1, wherein a security model includes intrusion detection and/or intrusion prevention configuration properties specific to a virtual machine.

8. The system of claim 1, wherein the management component is configured to apply the one or more security models to facilitate deployment of the service, add or remove servers to/from the service, perform configuration update of the service, start/stop of the service, and relocation of the service across physical hosts or networks.

9. The system of claim 1, wherein the one or more of the security models include mapping of the service to physical machines, host configuration lockdown for the service, and configuration of firewall, intrusion detection, and intrusion prevention to secure the service.

10. A computer-implemented systems management system, comprising:
    a security component configured to access security policies included in security models, wherein the security models define security requirements for services and provide, at least, mappings for the services according to a classification of workloads to provide a secured virtualized environment;
    a management component configured to associate functional models to the security models to assign the one or more security models to an appropriate function of a service of the logical services and to submit calls to the security component to obtain the security policies, and apply the security policies from one or more of the security models to a service over a lifecycle of the service; and a microprocessor configured to execute computer-executable instructions associated with at least one of the security component or the management component.

11. The system of claim 10, wherein the services include virtual machines to which the security models are applied, the virtual machines mapped to physical machines according to classification of workloads.

12. The system of claim 10, further comprising at least one of:
an authoring component for authoring the security models;
an auditing component that validates and detects discrepancies between a deployed system and the security model; or
a reporting component for producing reports of compliance to the one or more of the security models applied.

13. The system of claim 10, wherein the one or more of the security models include mapping of the servers the service is comprised of physical machines, networks to which virtual machines are connected, host configuration lockdown for the service and configuration of firewall, intrusion detection, and intrusion prevention subsystems to secure the service.

14. The system of claim 10, wherein the management component provides secure deployment of newly-added services according to a security model, and configuration of a network environment according to the security model.

15. A computer-implemented systems management method, performed by a computer system executing machine-readable instructions, the method comprising acts of:
accessing security policies included in security models, wherein the security models define security requirements for services and provides, at least, mappings for the services according to a classification of workloads to provide a secured virtualized environment;
receiving calls from a management system component for managing services in the virtualized environment according to functional service models;
associating the functional service models to the security models including security policies with the functional service models to assign the one or more security models to an appropriate function of a service of the logical services;
applying the security policies from the security models to the services through a lifecycle of the services to secure the computing environment; and
configuring a network environment according to one of the security models.

16. The method of claim 15, further comprising:
mapping the services to virtual machines; and
mapping the virtual machine to physical machines according to classification of machine workloads.

17. The method of claim 15, further comprising monitoring and reporting compliance of the management system component to security practices.

18. The method of claim 15, further comprising auditing a deployed service to validate and detect a discrepancy between the deployed service and an associated security model.

19. The method of claim 15, further comprising defining the security models to secure network isolation and connectivity, to deploy firewalls for different zones, to configure the firewalls, and configure intrusion detection and prevention systems.

20. The method of claim 15, further comprising managing relocation of a service to a different physical host according to a security model that re-assigns a virtual network to the different physical host.

21. The method of claim 15, further comprising:
adding a new virtual machine to a service according to a security model;
deploying the virtual machine to a specific host and network;
locking down the virtual machine; and
configuring firewall, intrusion detection, and intrusion prevention according to the security model.

22. The method of claim 15, further comprising:
removing a virtual machine from a service according to a security model; and
configuring firewall, intrusion detection, and intrusion prevention according to the security model.

* * * * *